Figure 1:
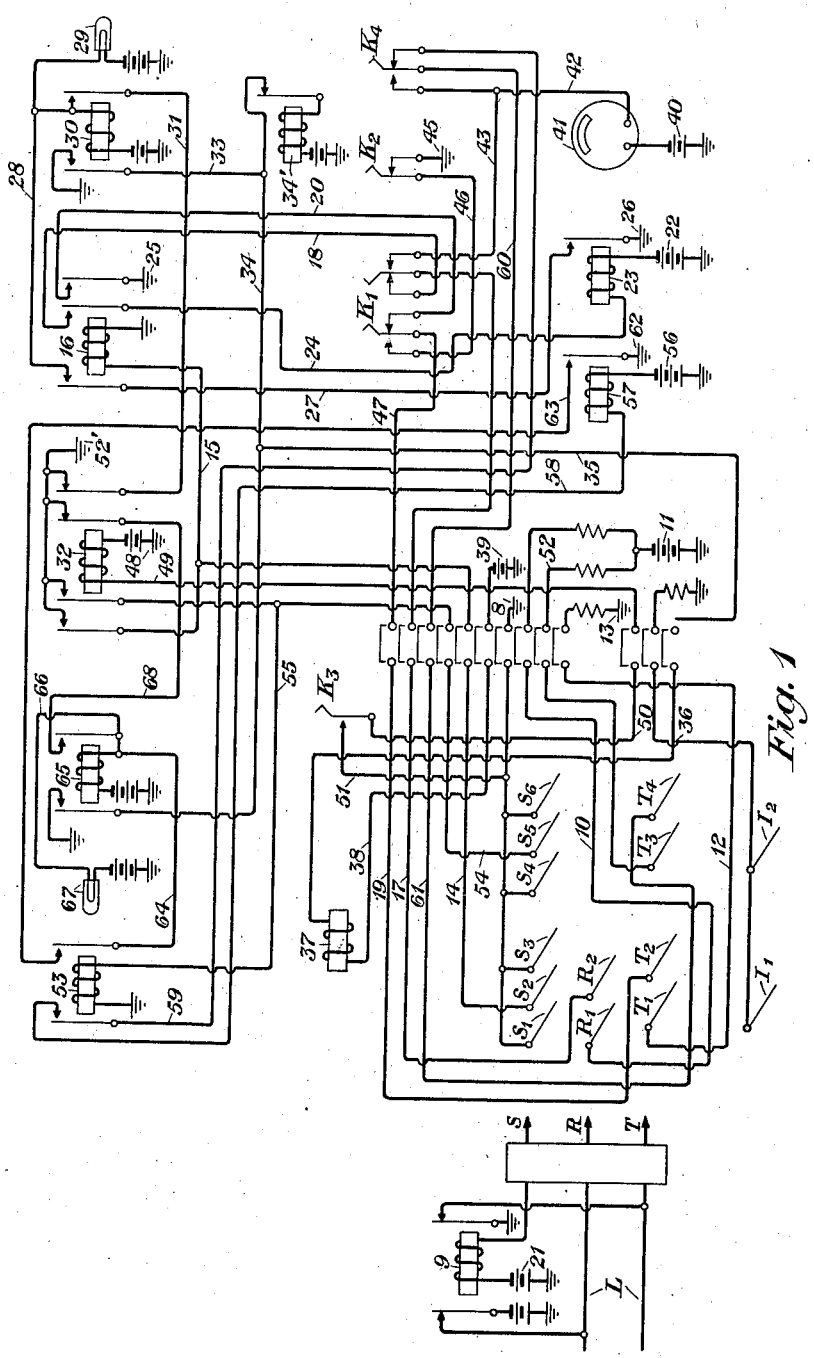

INVENTORS
F. J. Cannon & G. E. Goodwin
BY
Ralph W. Wolf.
ATTORNEY

April 2, 1946.  F. J. CANNON ET AL  2,397,837
APPARATUS FOR TESTING TELEPHONE LINES
Filed Dec. 7, 1943  2 Sheets—Sheet 2

INVENTORS
F. J. Cannon & G. E. Goodwin
BY
Ralph W. Wagg
ATTORNEY

Patented Apr. 2, 1946

2,397,837

UNITED STATES PATENT OFFICE 2,397,837

APPARATUS FOR TESTING TELEPHONE LINES

Frank Jess Cannon, Millbrae, and George Ellis Goodwin, San Anselmo, Calif., assignors to American Telephone and Telegraph Company, a corporation of New York Application December 7, 1943, Serial No. 513,234

7 Claims. (Cl. 179—175.11)

This invention relates to testing apparatus and more particularly to apparatus for making insulation tests on conductors in a telephone plant.

It is the practice to make periodic routine tests in a telephone plant to determine whether the insulation of the lines has become sufficiently defective, due, for example, to wet weather, to cause grounds or shorts and hence cause trouble on the lines. One of the objects of the arrangements of the invention is to provide a portable set capable of making routine leakage tests with great rapidity so that a great many lines connected to a telephone exchange can be tested in a comparatively short time. Another feature of the invention is to provide a testing set that will indicate whether the trouble consists of a ground or a short and will also indicate whether the ground, if it exists, is on the tip or ring side of the line. Other objects and features of the invention will appear more fully from the detailed description thereof hereinafter given.

In the arrangements of the invention a rapid voltmeter test of subscribers' lines is made for short circuits or grounds due to defective insulation by sliding a shoe containing a number of metal reed contacts over the line terminals of a distributing frame of a telephone exchange. A detachable flexible cable would connect the shoe to the test circuit which could be inclosed in a small cabinet designed to rest on a step of the distributing frame rolling ladder. The shoe might be equipped with a stop magnet which would function when a faulty line was reached to stop the movement of the shoe so that the faulty line could be recognized. The shoe might also be equipped with a small crank or motor driven device for advancing the shoe step-by-step at a constant speed over the terminals of the lines being tested.

As the shoe advances one of a first set of its contacts places a circuit condition, such as ground, on the sleeve of the line to be tested and operates its cut-off relay to remove battery and ground from the line provided it is not busy. Other contacts of this first set of contacts connect a battery through a high resistance to the ring side of the line and connect a ground through a high resistance to the tip side of the line. The battery and ground is placed on the line in advance of the line test in order to charge the line to the same polarity as the test circuit battery. This is in order to avoid a line capacity discharge into the test circuit which would cause a false trouble indication if the line was charged reversed to the test circuit battery. In other words, the line is first properly conditioned for the application of the test current.

As the shoe continues to move, another set of contacts will come into contact with the line. This set of contacts is connected to a testing relay. With further movement of the shoe the charging battery and ground, connected to the ring and tip of the line respectively, will be removed because the line has been properly charged for the application of the test current. The second set of contacts is associated with a relay. If the line is not busy this relay will operate and will apply a test battery to the ring and ground to the tip of the line over certain ones of the second set of contacts and through a second relay. If a ground or short exists on the line, current from the test battery will operate this second relay which in turn will operate a visual signal, an audible signal and the stop magnet and stop the forward movement of the shoe. The test man will now throw a key and connect the test battery to the ring of the line through a voltmeter and connect ground to the tip of the line. The voltmeter will give an indication of the amount of leakage on the line. To determine if this is due to a short or a ground on the ring the test man will now operate another key and remove the ground connected to the tip. If the voltmeter now continues to function he will know that the trouble is not caused by a short but is caused by a ground on the ring.

If trouble, such as a short or a ground on the ring, exists on the line and the foregoing actions took place the test man after completing his measurements of the trouble would now operate a release key. This would release the stop magnet, stop the audible alarm, extinguish the visual alarm, and allow the shoe to advance again. Obviously, if no trouble, such as a short or a ring ground existed, the shoe would continue its advance without the operation of the release key.

Having tested the line to determine if a short or a ground on the ring side of the line existed it is now desirable to test the line to see if a ground on the tip side of the line exists. Accordingly, as the shoe advances another set of contacts will come in contact with the line and will connect a battery through a large resistance to the tip. This battery is placed on the line in advance of the test to charge the tip to the same polarity as the test battery to avoid a capacity charge or discharge from falsely operating the testing apparatus.

As the shoe continues to move another set of contacts will come into contact with the line. This set of contacts is connected to a testing relay.

With further movement of the shoe the charging battery will be removed from the tip of the line as it has now been properly charged. If the line is not busy this relay will operate and connect test battery to the tip through another relay. If a ground exists on the tip this latter relay will operate, and will operate the stop magnet and a visual and audible alarm. The test man will now operate a key and connect the test battery through a voltmeter to the tip. The voltmeter will give an indication of the amount of leakage on the line due to the ground.

When the test man now operates the release key the test set is returned to normal and the shoe moves ahead to test other lines.

Figure 2:
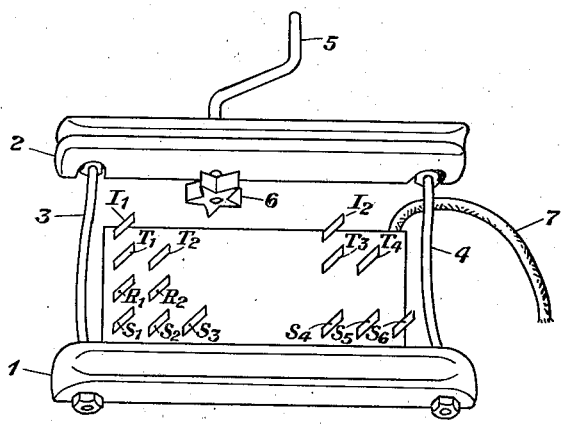
Figure 2:
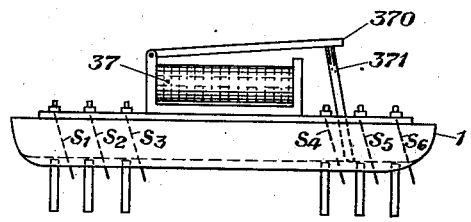

The invention may be more fully understood from the following description together with the accompanying drawings in the Figures 1, 2, 2', 3, 4, 5 and 6 of which the invention is illustrated. In Figure 1 is shown a circuit diagram of the testing set of the invention. Fig. 2 shows a view of the bottom of the shoe. Fig. 2' shows a side view of a portion of the shoe. Figs. 3, 4, 5, and 6 illustrate the operation of the metal reed contacts on the bottom of the shoe as they move over the line terminals on the distributing frame. Similar reference characters have been used to denote like parts in all of the figures.

In Fig. 2 is shown the bottom part of the shoe. Two grooved supporting members 1 and 2 are shown which are joined together by the members 3 and 4. These grooved supporting members are adapted to slide over the terminals of lines terminating at a distributing frame. In order that the shoe may move over the line terminals at a uniform rate it is provided with a small crank 5 which will operate a ratchet wheel 6 which will engage a set of the line terminals and move the shoe forward. The shoe is provided with four rows of contacts which might be of the metal reed type. As the shoe moves forward the contacts $S_1$, $S_2$, $S_3$, $S_4$, $S_5$ and $S_6$ would engage terminals connected to the sleeves of various lines. The contacts $R_1$ and $R_2$ would engage contacts connected to the ring conductors of the lines to be tested. Contacts $T_1$, $T_2$, $T_3$ and $T_4$ would engage contacts connected to the tip side of the various lines to be tested. The contacts $I_1$ and $I_2$ are provided to prevent interference and false failure indications when the shoe encounters intercepted subscribers' lines as will be pointed out hereinafter. The shoe and its contacts might be connected by a flexible cable 7 to the portable testing set. The shoe is equipped with a stop magnet 37 for stopping the shoe when trouble is encountered. This is shown in Fig. 2'. The stop magnet would be mounted on the top side of the arrangements shown in Fig. 2. It would be provided with an armature 370 which, when the magnet operates, would drive a pin 371 between a set of line terminals and stop the forward progress of the shoe.

Figure 3:
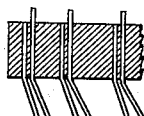
Figure 4:
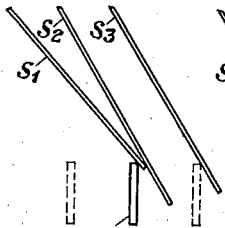
Figure 5:
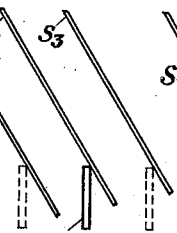
Figure 6:
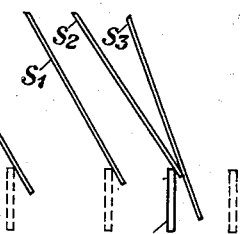

Figs. 3, 4, 5 and 6 show the manner in which the contacts will successively engage the terminals of the lines to be tested as the shoe is progressively moved forward. For purposes of illustration sleeve contacts $S_1$, $S_2$ and $S_3$ are shown. In Fig. 3 contact $S_1$ is shown resting on a terminal S connected to the sleeve of the line to be tested. As the shoe moves forward contact $S_2$ will leave the terminal on which it is resting and will come into contact with contact $S_1$ before $S_1$ leaves the terminal S. This is shown in Fig. 4. As the shoe moves progressively forward contact $S_1$ will leave the terminal S as indicated in Fig. 5, and later contact $S_3$ will leave the terminal on which it is resting and come into contact with contact $S_2$ before $S_2$ leaves the terminal S. This is shown in Fig. 6. The action of the R contacts and T contacts would be substantially the same as the S contacts.

In Fig. 1 is shown a circuit diagram of the portable testing set of this invention. The contacts $S_1$, etc., $R_1$, etc., and $T_1$ etc., are shown in this circuit diagram but, as heretofore pointed out, they would be mounted on the bottom of the shoe. For the purpose of illustrating the invention a line L is shown which is to be tested. This line would have a sleeve contact S, a ring contact R and a tip contact T terminating at the distributing frame, and as the shoe moves forward various ones of the S, R and T contacts would progressively come into contact with the terminals S, R and T. As the shoe advances contact $S_1$ will place a ground 8 on the sleeve terminal of the circuit L and this will operate the cut-off relay 9 which in turn will remove the battery and ground from the ring and tip sides of the line provided it is not busy. The contact $R_1$ will connect to the ring side of the line the conductor 10 which is connected through a high resistance to the battery 11. The contact $T_1$ will connect to the tip of the line L the conductor 12 which is connected through a resistance to the ground 13. The battery 11 will be the same voltage as the test battery to be used later on. Accordingly, the battery will be connected to the ring of the line and ground will be connected to the tip of the line. This battery and ground is placed on the line in advance of the line test in order to charge the line to the same polarity as the test circuit battery. This is in order to avoid a line capacity discharge into the test set causing a false trouble indication if the line is charged reversed to the test circuit battery. As pointed out heretofore the shoe is equipped with two springs $I_1$ and $I_2$ in order to prevent interference and false failure indications when it encounters intercepted subscribers' lines. These springs are located beyond the T springs in such a position as to contact the sleeve terminals of the intercepting trunk terminals which form the first three rows on all H. I. D. F. terminal blocks. These springs are connected to 112 ohms of ground in the test box to place a busy test condition on the sleeve terminals of all intercepting trunks encountered, thus preventing their interference with the test programs. As the shoe advances, contact $S_2$ makes contact with the sleeve of the line and also with the spring $S_1$. This is the condition illustrated in Fig. 4. This operation connects the ground 8 through contacts $S_1$ and $S_2$ to conductors 14 and 15 and thence through the winding of relay 16 to ground. Accordingly, relay 16 will not operate at this time as it is shunted to ground. Contacts $R_2$ and $T_2$ make contact with the tip and ring terminals of the line which at this time have contacts $R_1$ and $T_1$ resting on them. This again is the condition illustrated in Fig. 4. Contact $R_2$ is connected over conductor 17, contact of key $K_1$, conductor 18 to a contact of relay 16. Contact $T_2$ is connected over conductor 19, contact of key $K_1$, conductor 20 to a contact of relay 16. As relay 16 is not operated at this time contacts $R_2$ and $T_2$ are in effect open at this time. Further advancement of the shoe will now cause spring $S_1$ to break contact with the sleeve terminal. This is the condition illlustrated in Fig. 5. Battery 21 would then be connected over the sleeve of the line to contact $S_2$ and thence over conductors 14 and 15 to the winding of relay 16 and would cause relay 16 to operate. The operation of relay 16 will close the following circuit: from ground and battery 22, winding of relay 23, conductor 24, armature and contact of relay 16, conductor 18, contact of key K1, conductor 44, conductor 17, contact R2 to the ring conductor of the line. The operation of relay 16 will connect ground 25 to its armature and contact and thence over conductor 20, contact of key K1, conductor 47, conductor 19 to contact T2, and thence to the tip of the line. In other words, the operation of relay 16 will connect the test battery 22 to the ring side of the line and will connect ground 25 to the tip side of the line. If, due to faulty insulation, a short circuit exists between the tip and ring, or if a ground exists on the ring side of the line, a circuit will be completed over the above traced circuits through the test battery and the winding of relay 23 and will cause the relay 23 to operate. The operation of relay 23 will connect ground 26 over its armature and contact, over conductor 27, left-hand armature and contact of relay 16, conductor 28, and thence to battery through the winding of relay 30, and to battery through the filament of lamp 29. This will operate the lamp 29 which will give a visual signal to indicate that trouble exists on the line under test. The relay 30 will lock up over conductor 31 to ground 52', over the right-hand contact of relay 32. The operation of the relay 30 will cause a ground to be connected over its left-hand armature to conductor 33 and thence to the buzzer 34'. This will cause the buzzer to function to give an audible alarm that there is trouble on the line being tested. The operation of relay 30 will also close the following circuit: from ground, left-hand contact and armature of relay 30, conductors 33, 34, 35, 36, winding of stop magnet 37, conductor 38 to battery 39. This will operate the stop magnet. This stop magnet 37 might be provided with a horizontal pin (not shown) which would be driven between the terminals to prevent further advancement of the shoe.

Upon receiving a visual and an audible signal that trouble exists on the line, and upon operation of the stop magnet 37, the test man will throw the key K1. This will connect the test battery 40 through the voltmeter 41 and thence over conductors 42, 43, contact of key K1, conductor 44, conductor 17, contact R2 to the ring side of the line. Ground 45 will be connected over the contact of key K2 and conductor 46, and thence over the contact of key K1 to conductors 47 and 19 to contact T2, and thence to the tip of the line. A reading of the voltmeter will then indicate the amount of leakage on the line which is due either to a short or to a ground on the ring conductor of the line. To determine whether the trouble is due to a short or a ground on the ring side of the line, the test man will now operate the key K2. This will remove the ground 45 from the tip side of the line. If the trouble is due to a ground on the ring side of the line the previously traced circuit through the voltmeter 41 will be held closed and the functioning of the voltmeter will indicate that the trouble is due to a ground on the ring side of the line. If the voltmeter fails to function when the key K2 is operated, the test man will know that the trouble was caused by a short circuit between the tip and ring conductors of the line.

After the foregoing sequence of events takes place the test man will now operate the key K3. The operation of this key will close the following circuit: from ground and battery 48, winding of relay 32, conductor 49, conductor 50, contact of key K3, conductor 51 to ground 8. This will operate the relay 32. The operation of relay 32 will open the previously traced locking circuit for relay 30 and cause it to release. The operation of relay 32 will, over its left-hand armature and contact, place a shunt to ground 52' on relay 16 and cause it to release. The release of relay 16 opens the previously traced circuit for the relay 23 which will release and in turn release the relay 30 and the lamp 29. The release of relay 30 will open the previously traced circuits for the buzzer 34' and the stop magnet 37. The shoe is now at liberty to continue its advance across the line terminals.

Obviously, if no trouble had been encountered on the line, certain of the above described actions would not have taken place such, for example, as the operation of relay 23 and the subsequent operation of the buzzer and stop magnet. As the shoe advances the contact S3 would come into contact with the contact S2 which would be resting on the sleeve terminal of the line. This would be the condition illustrated in Fig. 6. The relay 16 which had previously been operated would now be released because it would be shunted to ground 8 by the closure of contact S3 with contact S2. The release of relay 16 would open the previously traced connection from test battery 22 to the ring side of the line and the previously traced connection from ground 25 to the tip side of the line. As the shoe advances further spring S4 makes contact with the sleeve terminal of the line under test and will connect ground 8 to the sleeve of the line and operate the cut-off relay 9 to remove battery and ground from the tip and ring sides of the line. Following this action contact T3 will make contact with the tip side of the line. The battery 11 will then be connected through a resistance to conductor 52 and thence to contact T3 and to the tip side of the line. This battery is placed on the line in advance of the test in order to charge the tip to the same polarity as the testing battery to avoid a capacity charge or discharge from falsely operating the test apparatus. As the shoe advances further spring S5 makes contact with the sleeve of the line under test and also makes contact with spring S4. This would be the condition illustrated in Fig. 4. When spring S5 is in contact with spring S4 ground 8 will be applied through contacts S4 and S5 and thence over conductor 54, conductor 55 and through the winding of relay 53. This will place a grounded shunt on relay 53 and it will not operate at this time. Contact T4 will also make contact with the tip terminal of the line. Advancement of the shoe will now cause spring S4 to break contact with the sleeve terminal of the line, shown in Fig. 5. The following circuit will then be closed: battery 21, winding of cut-off relay 9, contact S5, conductors 54 and 55, winding of relay 53 to ground. This will operate relay 53. The operation of relay 53 will close the following circuit: from ground and battery 56, winding of relay 57, conductor 58, left-hand contact and armature of relay 53, conductor 59, contact of key K4, conductor 60, conductor 61, contact T4 to the tip of the line. If a ground now exists on the tip of the line the closing of this circuit will operate the relay 57. The operation of the relay 57 will close the following circuit: from ground 62, armature and contact of relay 57, conductor 63, right-hand contact and armature of relay 53, conductor 64, winding of relay 65, to battery and ground. This will operate relay 65. The operation of relay 65 will apply a ground over its left-hand armature and contact to the previously traced circuit for the buzzer 34' and the stop magnet 37 and cause these two devices to function. The ground 62 applied by the operation of relay 57 to the winding of relay 65 will also be applied to conductor 66 and will operate the lamp 67. Relay 65 will lock up over its armature and contact and conductor 68 to ground 52. The test man will now operate the key K4. This will connect the test battery 40 through the voltmeter 41 and thence over conductor 42, contact of key K4, conductor 60, conductor 61, contact T4 to the tip of the line. The operation of key K4 will also disconnect the test battery 56 from the tip of the line. If a ground exists on the tip of the line the voltmeter will now function to indicate the amount of leakage. After making his voltmeter measurements the test man will now operate to release key. This will close the previously traced circuit for the relay 32 and cause it to operate. The operation of relay 32 will open the previously traced locking circuit for relay 65. The operation of relay 32 will place a shunt to ground 52 over its left-hand contact and armature on the winding of relay 53 and cause it to release. The release of relay 53 will open a previously traced circuit for the relay 57 and allow it to release. The release of relay 57 will open a previously traced circuit from ground 62 for the relay 65 and allow it to release. The release of relay 65 will extinguish the lamp 67 and will release the buzzer 34' and the stop magnet 37.

If no trouble was encountered on the tip of the line certain of the above described operations would not take place and the shoe in advancing further would cause contact S6 to come into contact with contact S5 which would still be resting on the sleeve of the line. This would be a condition similar to that illustrated in Fig. 6. This would place a shunt to ground 8 on the winding of relay 53 and cause it to release. The shoe would then advance further to test other lines consecutively.

It is pointed out that while a charging or testing operation is being performed upon the ring side of one line a similar operation is taking place upon the tip side of the preceding line. The simultaneous testing of two lines, which is possible with the arrangements of the invention, is one of the means by which speed of operation is attained.

While the invention has been disclosed as embodied in certain specific forms which are deemed desirable, it is understood that it is capable of embodiment in many and other widely varied forms without departing from the spirit of the invention as defined by the appended claims.

What is claimed is:

1. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, means operative when certain of said contacts are on said line terminals for charging the line under test to a definite polarity, a testing circuit having a test battery connected to one side thereof and a ground connected to the other side thereof, means operative when still other of said contacts are on said line terminals for connecting the battery side of said test circuit to the ring terminal of the line under test and for connecting the ground side of said test circuit to the tip terminal of the line under test, a relay in said test circuit adapted to be operated when said test circuit is completed by a short or a ground on the ring side of the line under test, and stop mechanism controlled by the operation of said relay for preventing said shoe from being further moved over the line terminals.

2. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, means operative when certain of said contacts are on said line terminals for charging the line under test to a definite polarity, a first testing circuit having a test battery connected to one side thereof and a ground connected to the other side thereof, means operative when still other of said contacts are on said line terminals for connecting the battery side of said test circuit to the ring terminal of the line under test and for connecting the ground side of said testing circuit to the tip terminal of the line under test, an indicating device and stop mechanism adapted to be operated when said testing circuit is completed by a short or by a ground on the ring side of the line under test, said stop mechanism being adapted to prevent said shoe from moving further over the line terminals, a second testing circuit having a test battery and a voltmeter connected to one side thereof and a ground connected to the other side thereof, a switching means for disconnecting said first mentioned testing circuit from the ring and tip terminals of the line under test and for connecting the battery and voltmeter side of said second testing circuit to the ring terminal of the line under test and for connecting the ground side of said second testing circuit to the tip terminal of the line under test, and a second switching means for disconnecting the ground side of said second testing circuit from the tip terminal of the line under test.

3. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, means operative when certain of said contacts are on said line terminals for charging the line under test to a definite polarity, a testing circuit having a test battery connected to one side thereof and a ground connected to the other side thereof, means operative when still other of said contacts are on said line terminals for connecting the battery side of said test circuit to the ring terminal of the line under test and for connecting the ground side of said testing circuit to the tip terminal of the line under test, an indicating device and stop mechanism adapted to be operated when said test circuit is completed by a short or by a ground on the ring side of the line under test, said stop mechanism being adapted to prevent said shoe from moving further over the line terminals, a second testing circuit having a test battery and a voltmeter connected to one side thereof and a ground connected to the other side thereof, a switching means for disconnecting said first mentioned testing circuit from the ring and tip terminals of the line under test and for connecting the battery and voltmeter side of said second testing circuit to the ring terminal of the line under test and for connecting the ground side of said second testing circuit to the tip terminal of the line under test, and a release key which if operated after said switching means has been restored to normal will release said indicating device and said stop mechanism and will disconnect said first testing circuit from said line under test.

4. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, a testing circuit having a test battery connected to one side thereof and a ground connected to the other side thereof, means operative when certain of said contacts are on said line terminals for connecting the battery side of said test circuit to the ring terminal of the line under test and for connecting the ground side of said testing circuit to the tip terminal of the line under test, a relay in said test circuit adapted to be operated when said test circuit is completed by a short or by a ground on the ring side of the line under test, responsive means controlled by the operation of said relay, means operative when still other of said contacts are on said line terminals for disconnecting said first testing circuit from the tip and ring terminals of the line under test, a second testing circuit having a test battery connected thereto, means operative when still other of said contacts are on said line terminals for connecting said second testing circuit to the tip terminal of the line under test, a relay in said second testing circuit adapted to be operated when said second testing circuit is completed by a ground on the tip side of the line under test, and responsive means controlled by the operation of said last mentioned relay.

5. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, a testing circuit having a test battery connected to one side thereof and a ground connected to the other side thereof, means operative when certain of said contacts are on said line terminals for connecting the battery side of said test circuit to the ring terminal of the line under test and for connecting the ground side of said testing circuit to the tip terminal of the line under test, a relay in said test circuit adapted to be operated when said test circuit is completed by a short or by a ground on the ring side of the line under test, responsive means controlled by the operation of said relay, means operative when still other of said contacts are on said line terminals for disconnecting said first testing circuit from the tip and ring terminals of the line under test, a second testing circuit having a test battery connected thereto, means operative when still other of said contacts are on said line terminals for connecting said second testing circuit to the tip terminal of the line under test, a relay in said second testing circuit adapted to be operated when said second testing circuit is completed by a ground on the tip side of the line under test, responsive means controlled by the operation of said last mentioned relay, and means operative when still other of said contacts are on said line terminals for disconnecting said second testing circuit from the tip terminal of the line under test.

6. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, means operative when certain of said contacts are on said line terminals for charging the line under test to a definite polarity, a testing circuit having a test battery connected to one side thereof and a ground connected to the other side thereof, means operative when still other of said contacts are on said line terminals for connecting the battery side of said test circuit to the ring terminal of the line under test and for connecting the ground side of said testing circuit to the tip terminal of the line under test, a relay in said test circuit adapted to be operated when said test circuit is completed by a short or by a ground on the ring side of the line under test, responsive means controlled by the operation of said relay, means operative when still other of said contacts are on said line terminals for disconnecting said first testing set from the tip and ring terminals of the line under test, means operative when other of said contacts are on said line terminals for charging the tip side of the line under test to a definite polarity, a second testing circuit having a test battery connected thereto, means operative when still other of said contacts are on said line terminals for connecting said second testing circuit to the tip terminal of the line under test, a relay in said second testing circuit adapted to be operated when said second testing circuit is completed by a ground on the tip side of the line under test, responsive means controlled by the operation of said last mentioned relay, and means operative when still other of said contacts are on said line terminals for disconnecting said second testing set from the tip terminal of the line under test.

7. A device for testing telephone lines comprising a shoe having a set of sleeve contacts, a set of ring contacts and a set of tip contacts, said shoe being adapted to be slideably moved over the line terminals of a distributing frame whereby the several sleeve contacts, the several ring contacts and the several tip contacts will progressively contact the tip, ring and sleeve terminals of a line to be tested, a first testing circuit having a test battery connected to one side thereof and a ground connected to the other side thereof, means operative when certain of said contacts are on said line terminals for connecting the battery side of said testing circuit to the ring terminal of the line under test and for connecting the ground side of said testing circuit to the tip terminal of the line under test, a responsive device adapted to be operated when said first testing circuit is completed by a short or by a ground on the ring side of the line under test, a second testing circuit having a test battery and a voltmeter connected to one side thereof and a ground connected to the other side thereof, a first switching means for disconnecting said first testing circuit from the ring and tip terminals of the line under test and for connecting the battery and voltmeter side of said second testing circuit to the ring terminal of the line under test and for connecting the ground side of said second testing circuit to the tip terminal of the line under test, a second switching means for disconnecting the ground side of said second testing circuit from the tip terminal of the line under test, a third testing circuit having a test battery connected thereto, means operative when still other of said contacts are on said line terminals for connecting said third testing circuit to the tip terminal of the line under test, a responsive device adapted to be operated when said third testing circuit is completed by a ground on the tip side of the line under test, a fourth testing circuit having a test battery and a voltmeter connected thereto, and a third switching means for disconnecting said third testing circuit from the tip terminal of the line under test and for connecting said fourth testing circuit to said tip terminal.

FRANK JESS CANNON.
GEORGE ELLIS GOODWIN.